July 28, 1936. J. H. KINDELBERGER ET AL 2,049,066
AIRPLANE HAVING UNIQUE RETRACTABLE LANDING DEVICE
Filed Feb. 27, 1934 3 Sheets-Sheet 1
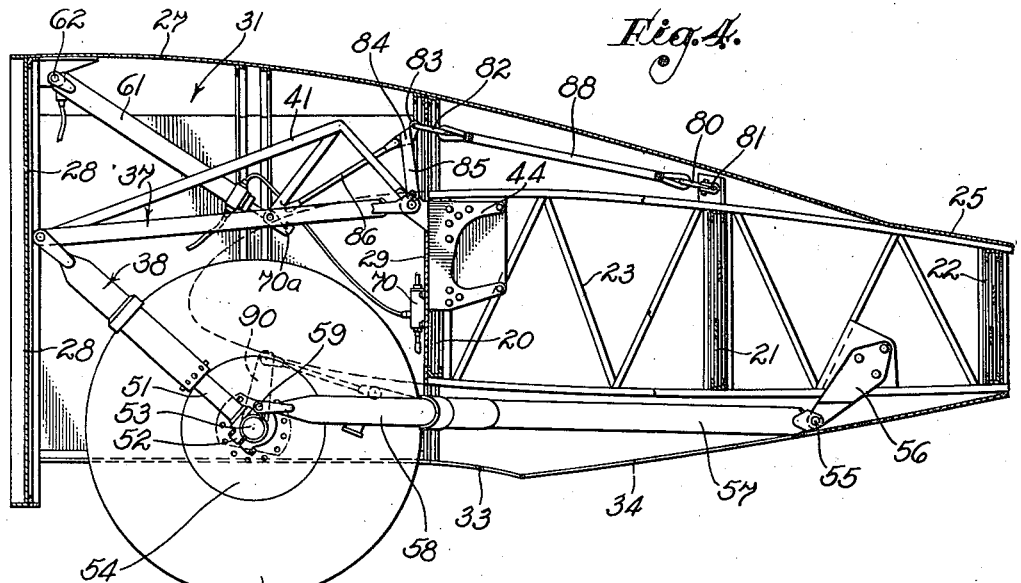
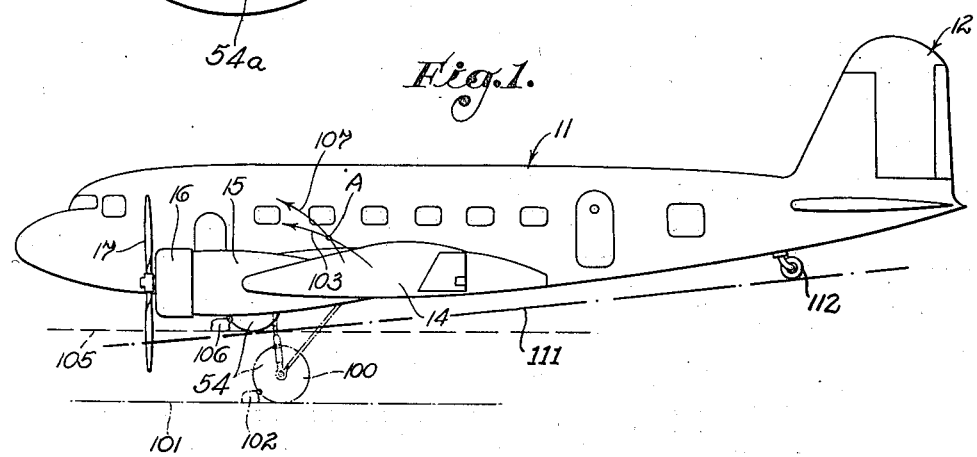
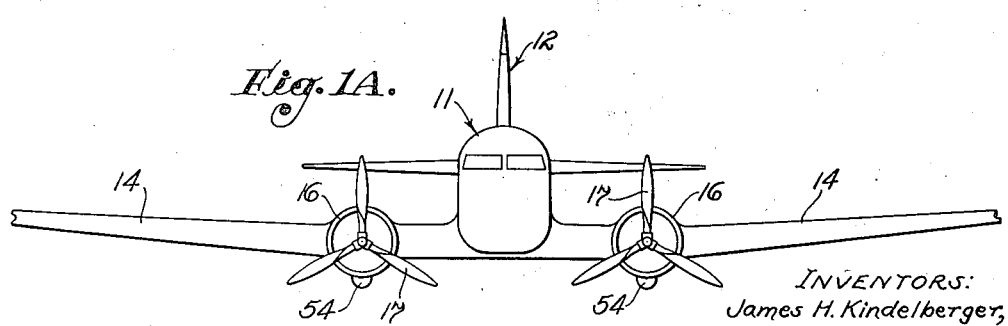
INVENTORS:
James H. Kindelberger,
Arthur E. Raymond,
BY Fred W. Harris
ATTORNEY.

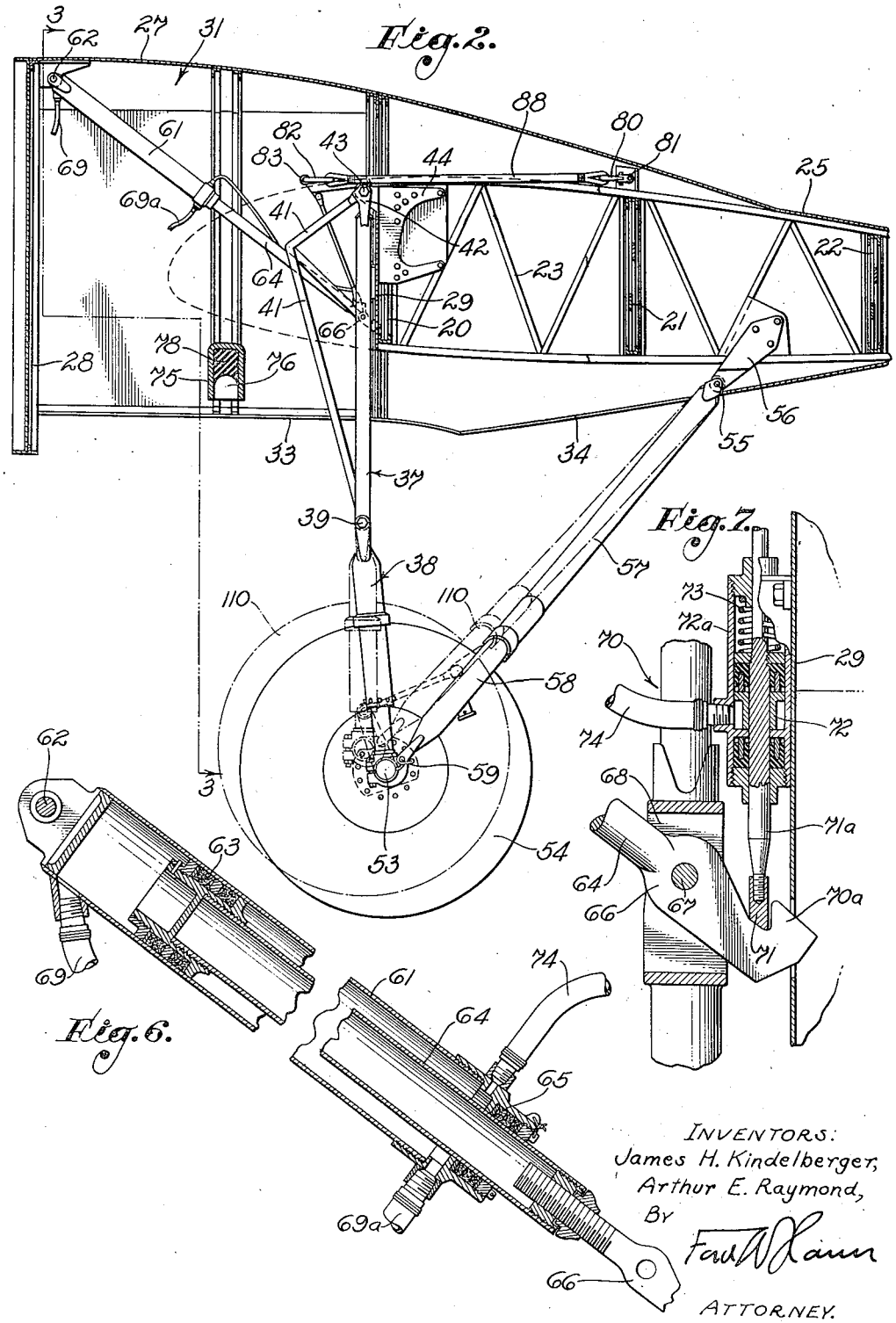

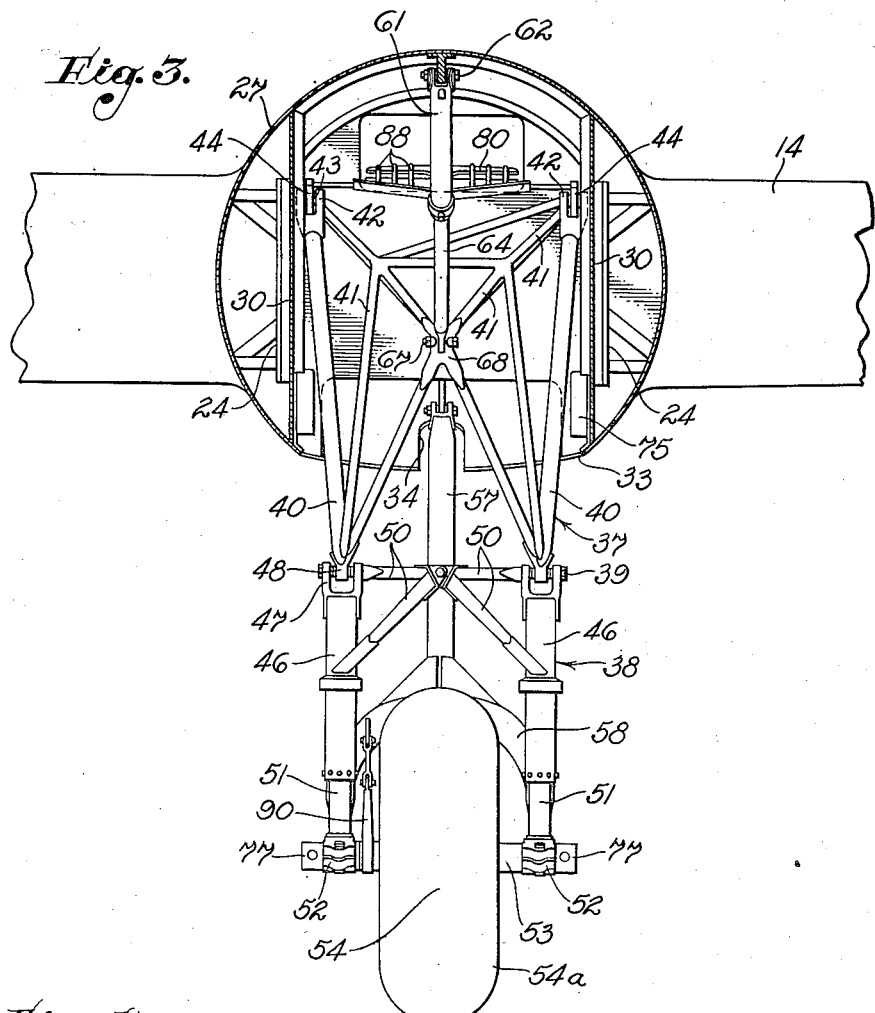
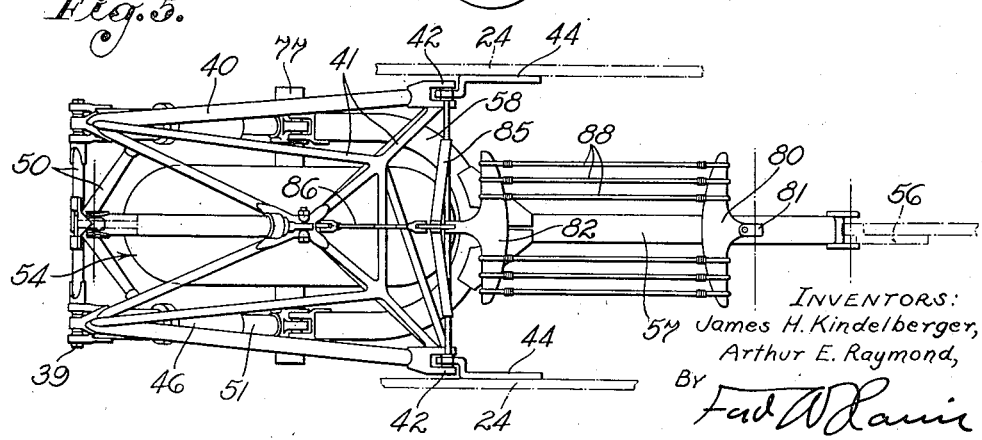

Patented July 28, 1936

2,049,066

UNITED STATES PATENT OFFICE 2,049,066

AIRPLANE HAVING UNIQUE RETRACTABLE LANDING DEVICE

James H. Kindelberger, Los Angeles, and Arthur E. Raymond, Santa Monica, Calif., assignors to Douglas Aircraft Company, Inc., Santa Monica, Calif., a corporation of Delaware Application February 27, 1934, Serial No. 713,220

8 Claims. (Cl. 244—2)

Our invention relates to airplanes, and particularly to an airplane having a unique landing gear construction which enables the realization of important features and advantages over the prior art.

It is an object of our invention to provide an airplane in which the center of gravity may be lowered relative to a landing surface when the airplane is landed, in order that safer landings may be made when in emergencies the pilot is required to land the airplane on uneven or rough ground. This object of our invention we accomplish by providing a landing gear which may be positioned in a relatively raised position for landing, in which position the airplane fuselage will approach closer to the ground than with the landing gear in a relatively lowered or normal landing position. With the center of gravity in this relatively lowered position there is less danger of the airplane nosing over.

It is furthermore an object of our invention to provide an airplane having a landing gear which has a "raised" and a "lowered" position for landing purposes.

Another object of our invention is to provide means for receiving the landing shock from the landing wheel; and in the preferred form of our invention we provide a separate shock-absorbing means for this purpose when the landing gear is in raised position.

A further object of our invention is to increase the safety with which landings may be made on uneven or rough surfaces by providing a landing gear which moves forwardly into a raised position in order that the center of gravity of the fuselage will not only be lowered, but will be a greater distance to the rear of the landing gear when the landing gear is in its raised position than when the landing gear is in its lowered position.

In the airplane of our invention the landing gear including the wheel which is ordinarily employed is entirely enclosed in the raised position with the exception of the lower portion of the landing wheel which projects downwardly through an opening in the enclosure in order that the same may engage the surface on which the landing is made.

In the preferred form of our invention the enclosure is provided directly in front of the wing, and the landing gear and associated parts are so designed that the wing structure of the plane will not be weakened.

In the preferred form of our invention we provide an airplane in which there are two motors, one placed directly in front of each wing. Connecting each motor to each wing is a nacelle which is preferably of stream-line contour and which provides a pocket in front of the wing but in back of the motor in which pocket the parts of the landing gear are movable.

It is in accordance with this construction an object of our invention to provide an airplane having a suitable stream-line housing provided in front of the wing structure into which the parts of the landing gear may be raised during flight and for the purpose of landing on uneven or rough surfaces.

The landing gear construction which incorporates the important features of our invention includes a shock absorber or oleo strut which is associated with the landing wheel and other parts which are movable by the shock or force of landing when the airplane is landed. There are also other parts which are rigidly held in extended or lowered position so that there is no vibration nor movement of the landing gear as a whole which would produce strains which would tend to injure the landing gear.

It is a further object of our invention to provide a landing gear in which the parts may readily move to absorb the shock of landing without the parts being moved from extended position and without the parts being moved into such positions that injurious strains might be set up in the landing gear.

A further object of our invention is to provide a landing gear in which the load imposed on the raising and lowering means, or what is known as the "operating means" of our invention, is substantially uniform.

It is a still further object of our invention to provide a brake means for the landing wheel which will operate when the landing wheel is in a lowered or in a raised position in order that the airplane may be controlled when landing on a surface with the landing gear either in a lowered position or in a raised position.

It is also an object of our invention to provide a lock means for positively locking the landing gear in its lowered position. Such lock means in the preferred form of our invention is automatically released when the mechanism for raising the landing gear to its raised position is actuated.

Other objects and advantages of our invention will be pointed out in the following detailed description of one form of our invention which incorporates the salient features thereof. It should be strictly understood, however, that the form of our invention illustrated herein is the preferred form and that various changes in construction might be made while employing the principle of operation of our invention and while accomplishing the objects and advantages of our invention as set forth herein, without departing from the spirit and scope of the invention.

Referring to the accompanying drawings:

Fig. 1 is an elevational view of an airplane embodying the features of our invention.

Fig. 1A is a front view of Fig. 1.

Fig. 2 is a sectional view through a portion of the wing and nacelle construction showing the landing gear of our invention in a lowered or extended position.

Fig. 3 is a sectional view taken as indicated by the line 3—3 of Fig. 2.

Fig. 4 is a view similar to Fig. 2 but showing the parts of the landing gear of our invention in a relatively raised or retracted position.

Fg. 5 is a plan view of the landing gear with the parts in raised position as shown in Fig. 4.

Fig. 6 is a sectional view of the operating means of our invention.

Fig. 7 is a fragmentary view partially sectioned illustrating a lock means for locking the landing gear in its lowered position.

Referring to the drawings in detail, and particularly to Fig. 1, the construction and operation of the form of our invention shown herein will now be described. The numeral 11 represents the fuselage of a cabin plane. This fuselage 11 is provided with a tail construction 12 which may be constructed in accordance with standard design. Extending outwardly from the lower portion of the fuselage is a pair of wings 14, one wing being extended outwardly from each side of the fuselage 11 in accordance with standard practice. Each wing 14 has extended forwardly therefrom a nacelle or housing 15 at the forward part of which a motor housing 16 (which encloses a motor) is supported. Each of the motors drives a propeller 17 whereby the airplane may be propelled.

In view of the fact that the landing gear construction provided by our invention is in two separate landing gears, one being supported by each wing, as shown in Fig. 1A, we will describe one of the landing gears and will confine the description to the singular, it being understood, however, that there are two such constructions, as shown in Figs. 2 to 6, inclusive, which are identical with the exception that one is a right-hand construction and that the other is a left-hand construction.

The wing 14 includes three spars, a front spar 20, a central spar 21, and a rear spar 22, these spars extending laterally outward from the fuselage of the airplane. Secured to the spars 20 to 22, inclusive, is a plurality of trusses which are arranged in planes at right angles to the plane of extension of the spars 20 to 22 inclusive. Our present invention is concerned particularly with three trusses which will be herein designated as a central truss 23 and side trusses 24. The spars and trusses of the wing 14 are covered with a skin 25.

The nacelle 15 is provided in the form of a shell 27 which is substantially circular in cross-section and which gradually diminishes in size toward its rearward end so that it converges into the wing 14 so that the construction is streamline. As will be noted, the nacelle 15 is somewhat deeper than the wing 14. Within the nacelle 15 is a front bulkhead 28, a rear bulkhead 29, and side bulkheads 30 which cooperate to provide a pocket 31. This pocket 31 is somewhat deeper than the wing 14 and therefore provides sufficient space to receive the landing gear of our invention. The lower part of the shell 27 immediately below the pocket 31 provides an opening 33 and connected thereto and extending rearwardly therefrom is a slot 34.

The landing gear of our invention includes a strut which has, what we term, an upper link or section 37 and a lower link or section 38 which are pivotally connected together by a pivot 39. The upper link, as best shown in Fig. 3, includes a pair of strut-arms 40 which are connected to each other by bracing generally designated by the numeral 41. There are a number of these bracings 41 which are designed so that this upper link or section is capable of withstanding the stresses to which it is subjected. The upper ends of the strut-arms 40 are provided with clevises 42 which are connected by pivot bolts 43 to brackets 44 secured to the side trusses 24, as shown best in Fig. 5. The lower links or sections include bodies or cylinders 46 which constitute parts of oleo struts or shock absorbers. The upper end of each body 46 is provided with a clevis 47 to receive the pivots 39 which also extend through lugs 48 provided at the lower ends of the strut-arms 40. The two bodies 46 are spaced apart as shown and are secured to each other by reinforcing arms 50 which are connected to each other, as shown. Extended downwardly from the interior of the bodies 46 are plungers 51 which are adapted to move relatively to the bodies 46 in an axial direction in order to absorb the shock of landing. The lower ends of the plungers 51 are provided with clamps 52 through which an axle 53 is extended, the axle 53 being thus rigidly secured to the two plungers 51 by means of the clamps 52. The axle 53 rotatably supports a landing wheel 54 which has a pneumatic tire 54a which is relatively large as compared to the diameter of this wheel and has shock-absorbing qualities.

Pivoted at 55 to a bracket 56 which is secured to the central truss 23 is a swingable arm 57. The forward end of this swingable arm 57 is provided with a fork having arms or bifurcations 58 which are connected by pivots 59 to the clamps 52.

In Figs. 2 and 3 of the drawings the strut including the upper and lower links 37 and 38 is shown in an extended position or in a lowered position, while in Fig. 4 these parts are shown in a retracted or raised position. It will be noted that when the parts are in the extended or lowered position, the upper link 37 is in substantially a vertical position and lies close to the rear part of the pocket 31 and extends substantially parallel to the rear bulkhead 29. The lower link 38 is at a slight angle to the upper link 37 and extends downwardly and rearwardly, as shown. When the parts are in their relatively raised position it will be noted that the upper link 37 swings forwardly into its raised position and that the upper end of the lower link moves therewith. The lower end of the lower link is guided through a predetermined path by means of the swingable arm 57. It will noted that the arm 57 swings around the pivot 55 and therefore causes the landing wheel 54 to move upwardly and forwardly into a position within the pocket 37, as shown in Fig. 4. In this position, however, the lower part of the wheel and the lower part of the tire 54a project from the nacelle 15.

It is quite important to the invention to have the parts fold or collapse forwardly, as illustrated, in view of the fact that by such a design it is unnecessary to cut portions from the wing other than a very small section in front of the front spar 20, to accommodate the landing gear. It is unnecessary to in any way weaken the spars 20, 21 or 22 or the wing construction as a whole. It is therefore quite important to have the swingable arm 57 which extends forwardly from a pivot and to have the strut including the parts 37 and 38 swing forwardly into a collapsed position within the pocket 31, as shown in Fig. 4.

The parts are moved between lowered and raised position by an operating means which includes a cylinder 61 pivotally supported in the forward upper corner of the pocket 31 on a pivot 62. This cylinder 61 is adapted to receive a piston 63 which is slidable therein and from which there extends a rod in the form of a tube identified by the numeral 64, this rod 64 extending through a stuffing box 65. The outer end of the rod 64 is provided with an eye 66 and is connected by means of a pivot 67 to a connection portion 68 formed at the center of the upper link 37 where certain of the bracings 41 meet. This pivot point is in a plane which extends through the strut-arms 40 and is in a position below the pivot 43 a distance substantially one-third of the distance between the pivot 43 and the pivot 39. For the purpose of supplying fluid for moving the rod 64, a hose 69 is connected to the upper end of the cylinder 61 and a hose 69a is connected to the lower end of this cylinder. Fluid, therefore, may be introduced into the cylinder either above or below the piston 63 with the result that the piston 63 and rod 64 may be forced from the cylinder 61 or forced into the cylinder 61, as desired. These hose 69 and 69a are extended to the pilot's compartment in the fuselage where they are connected to suitable actuating apparatus. Since that construction does not compose a part of this invention, the hose 69 and 69a are not completely shown but are broken away in the drawings.

Our invention also includes a means for locking the landing gear in its extended or lowered position in order to obviate the possibility of the landing gear collapsing in the event that the fluid pressure in the cylinder 61 above the piston 63 for any reason failed. The lock means of our invention may be automatically operated when the mechanism for raising the landing gear is operated or it may be independently operable by the pilot. In the event that the lock means is independently operable either mechanical or hydraulic means may be employed. In the preferred form of our invention we find it highly desirable to have the lock means operable as a part of the mechanism which raises and lowers the landing gear. This simplifies the construction and enables the landing gear to be raised or lowered solely by the manipulation of the operating means which raises and lowers the landing gear.

This function we provide for by the use of a latch arrangement generally designated by the numeral 70 which includes a latch 70a formed on the outer end of the rod 64, as best shown in Fig. 7. Cooperating with the latch 70a is a latch dog 71 mounted on the lower end of a rod 71a, upon which is secured a piston 72 adapted for reciprocation in a cylinder 72a, secured as by bolts in the manner shown upon the rear bulkhead 29. The piston 72 is normally forced downwardly by a compression spring 73 confined between the piston and the upper wall of the cylinder 72a, so that the latch dog 71 normally is in a lowered position adapted to cooperate with the latch 70a. Connecting the space within the cylinder 61 below the piston 63 with the space within the cylinder 71a below the piston 72, substantially in the manner shown, is a hose 74.

It will be apparent from the foregoing description that when fluid under pressure is delivered to the cylinder 61 through the hose 69a to raise the landing gear in the manner heretofore described, fluid under pressure will also be delivered to the space below the piston 72 in the cylinder 72a, which acts to raise the piston 72 against the action of the spring 73, thus releasing the dog 71 from engagement with the latch 70a and permitting the landing gear to rise.

For the purpose of receiving landing forces when the airplane is landed with the landing gear in retracted position, we provide stops 75 which are secured on opposite sides of the pocket 31 and which are secured to the side bulkheads 30 as shown. These stops 75 provide downwardly opening sockets 76. The axle 53 is provided with outwardly projecting axle extensions 77 which are adapted to rest in the sockets 76 when the landing gear is in a raised position. It will be seen that when the parts are in a raised position the strut including the parts 37 and 38 is not positioned so as to be adapted for receiving and transmitting the landing forces or shocks. It is therefore desirable to provide a means for directly transferring such forces or shocks to the nacelle and wing construction. By providing the axle extension 77 in the sockets 76 of the stop 75, the landing force is transferred directly to the bulkheads 30, and the strut including the parts 37 and 38 is relieved by any forces or shocks at that time. It is unnecessary to provide elaborate shock-absorbing means and although shock-absorbing means might be eliminated, we prefer to provide the stops 75 with rubber cushions 78 which at least will partly absorb the force of landing. It should be understood that, if desired, the stops 75 may be supported on oleo struts secured to the sides of the pocket 31, which oleo struts might have bodies secured in stationary positions and plungers extending downwardly therefrom, the lower ends of which might be engaged by the axle extensions 77. The operation of such oleo struts would be the same as any oleo strut construction used in the airplane industry.

In order that the load imposed on the operating means may be substantially uniform, we provide a bungee mechanism which, as shown best in Fig. 5, includes a head 80 secured at 81 and a head 82 which is connected by a link 83 to the corner of a frame 84 which is secured to the upper part of the upper link 37. This frame 84 is composed of small struts 85 which extend from the pivot 43 and a tie or tension member 86 which is connected to the outer ends of the struts 85 at its upper end and to the connection 68 at its lower end. The heads 80 and 82 are connected together by a series of elastic members 88. The bungee exerts a pull on the upper link 37 in a clockwise direction around the pivot 43. When the parts are in the position shown in Fig. 2, the moment of the bungee is relatively small due to the fact that the lever arm from the pivot 43 to the point where the link connects to the small frame 84 is relatively small. When the parts are in the position shown in Fig. 4, the moment is increased due to the fact that the effective lever arm is much greater. When the parts are in extended position, less force is required to move them upwardly than when the parts approach a retracted position. Therefore, as the parts approach the retracted position the moment exerted by the bungee gradually increases and therefore places a substantially constant load on the operating means.

For the purpose of controlling the movement of the airplane while on the ground and to facilitate steering, each of the wheels 54 is provided with a brake mechanism, each having a brake arm 90 which is connected by suitable operating mechanism to the pilot's compartment. The brakes are so designed that they are operative when the landing gear is in a lowered or raised position. Therefore, it is possible to operate the brakes at either time and to have equal control over the airplane while it is moving on the ground.

Referring to Fig. 1, the center of gravity of the airplane is indicated by the cross A. Broken lines 100 of this view represent the landing gear in extended position, while full lines represent the lower portion of the wheel 54 when the landing gear is in retracted position. When the landing gear is in extended position and the plane is resting on a surface, the fuselage and wing structure are in a relatively elevated position. They are distanced from the ground sufficiently that the propeller 17 will have ample clearance. These relative positions of the parts of the plane are most suitable for landing and operating conditions, and it has been common practice to provide landing gear constructions on which an airplane may be landed when the parts are in extended positions. Experience has taught, however, that when there is a forced landing and it is necessary to land on an uneven or broken field there is a strong tendency for the airplane to nose over and turn turtle and, in fact, in a great many instances serious injury to the plane and passengers has resulted. This, of course, is due to the fact that when the landing gear is in an extended position there is a relatively large vertical distance between the ground level, as indicated by the dotted line 101, and the center of gravity A of the airplane. When the wheel or wheels of the landing gear engage an obstruction, such as indicated at 102 in Fig. 1, there is a tendency for the airplane to rotate around this obstruction, as indicated by an arrow 103, which passes through the center of gravity A. It will be seen that the center of gravity need rise but slightly in order to swing forwardly around the obstruction 102 and nose into the ground.

We have conceived the idea of providing a retractable landing gear in which the landing gear is so designed that a landing may be made when the gear is in retracted position. Therefore, as illustrated herein, the airplane may be landed when the landing gear has been retracted. When a landing is made with the landing wheel in a relatively raised position, the fuselage rests relatively close to the ground. When a landing is so made, the ground level relative to the airplane will be as indicated by the broken line 105 of Fig. 1. It is an important feature of our invention to raise the landing wheel forwardly and upwardly so that when in raised position the wheel is a farther distance in front of the center of gravity A than when the wheel is in a relatively lowered position. When a landing is made with the landing gear in raised position, there is but little clearance between the fuselage and wing construction and the ground, and the propeller 17 would, of course, be broken. However, there is but little danger of the plane nosing over for the reason that the center of gravity A is at this time relatively low and at a greater distance behind the landing wheels. Should the landing wheel or wheels engage an obstruction 106, there will be a tendency for the airplane to move around this obstruction 106, as indicated by an arrow 107, passing through the center of gravity A. It will be seen that in view of the relative positions between the landing wheel 54, the ground 105, and the center of gravity A, it is necessary for the center of gravity to move upwardly and forwardly a considerable distance before the plane can nose over. In view of the fact that much greater force is required to nose the plane over when the wheel is in raised position than when the wheel is in lowered position, there will be but little danger of such an occurrence.

As further shown in Fig. 1, the tail of the fuselage is provided with a tail-skid means, such as the landing wheel 112, which supports the tail portion of the airplane when it is resting or travelling or landing on the ground. In making a three point landing which is a perfect landing and eliminates to a maximum extent possible the shocks of landing, the tail-skid means 112 and the landing wheels 54 must all engage the ground at the same time. Therefore, in making a perfect landing the airplane is positioned relative to the ground as indicated by the ground line 111, this ground line intersecting the lower portion of the tail-skid means and the wheels 54 which are in raised position during a landing of the plane under consideration. The stop means or the shock absorbing means provided by the invention is so positioned that when the landing wheels 54 are in raised position a line drawn through the lower part of these landing wheels and the lower part of the tail-skid means will be entirely below the fuselage, the wing structure, and the nacelles of the airplane. In other words, the landing apparatus, the tail-skid means, and other parts of the airplane are so designed that when the plane is landed with the landing wheels in retracted position no parts of the airplane other than the landing wheels 54 and the tail-skid means 112 will engage the ground.

The operation of the landing gear is quite apparent from the foregoing description. Fig. 2 shows the parts in extended position. It will be noted that the rod 64 is fully extended, and in view of the presence of a fluid under pressure in the cylinder 61 and the lock means 70, the cylinder 61 and rod 64 constitute a rigid connection and the upper link 37 is rigidly held in extended position. When landing with the structure in extended position the shock is absorbed by the oleo struts or shock absorbers in the lower link 38. The lower link 38, the plunger of the oleo struts, and the swingable arm 57 are movable to absorb shocks. The upper link 37, however, is rigidly retained in extended position and cannot move unless the operating means is actuated. Therefore, in order to absorb shock the movable parts 38, 54, and 57 may move into positions indicated by dotted lines 110 of Fig. 2. When it is desired to raise the landing gear, fluid under pressure is supplied through the hose 69a and the hose 74 to release the lock means 70 and the rod 64 is pulled into the cylinder 61, thus collapsing the strut composed of the links 37 and 38 into the pocket 31, as shown in Fig. 4.

It will be seen that the strut collapses forwardly and upwardly into the pocket. This is a very important feature of our invention, since it eliminates any requirement for cutting away the wing section to receive the landing gear construction. It is further very important because it raises the wheel 54 upwardly and forwardly into the position shown, whereby a relatively safe landing may be made on an uneven surface. When in this raised position, the shock of landing is transmitted directly to the plane structure through the stop 75, as previously pointed out.

We claim as our invention:

1. In an airplane, the combination including: a wing structure having a spar and a downwardly facing pocket ahead of said spar; pivot means in the rearward part of said pocket; a retractable landing gear adapted to be retracted into said pocket, said landing gear including a strut consisting of two links pivoted together and extending downwardly from said pivot means when said landing gear is in extended position, a landing means at the lower end of said strut, and a swingable arm connected to said strut and to said wing structure rearwardly from said pocket; and means for collapsing said links in a forward and upward direction into said pocket to carry said landing means into said pocket.

2. In an airplane, the combination including: a wing structure having a spar and a downwardly facing pocket ahead of said spar; pivot means in the rearward part of said pocket; a retractable landing gear adapted to be retracted into said pocket, said landing gear including a strut consisting of two links pivoted together and extending downwardly from said pivot means when said landing gear is in extended position, a landing means at the lower end of said strut, and a swingable arm connected to said strut and to said wing structure rearwardly from said pocket; means for collapsing said links in a forward and upward direction into said pocket to carry said landing means into said pocket; a latch member for holding said strut in said downwardly extending position; and means cooperating with said collapsing means to automatically release said latch member in consequence of the actuation of said collapsing means.

3. In an airplane, the combination including: a body structure; a pivot member on said body structure; a strut comprising an upper link and a lower link hinged together, said upper link being adapted to swing on said pivot member from retracted to extended position; a landing means connected to said lower link; a lever having one end thereof connected to said body and the other end thereof connected to said lower link; resilient means exerting a force to rotate upper link toward said retracted position; force exerting means operative to swing said upper link from said retracted position to said extended position; and a latch operating to hold said upper link rigidly in said extended position.

4. In an airplane, the combination including: a body structure; a pivot member on said body structure; a strut comprising an upper link and a lower link hinged together, said upper link being adapted to swing on said pivot member from retracted to extended position; a landing means connected to said lower link; a lever having one end thereof connected to said body and the other end thereof connected to said lower link; resilient means exerting a force to rotate said upper link toward said retracted position; force exerting means selectively operable to swing said upper link to and from said retracted and extended positions; and a releasable latch operating to hold said upper link in said extended position, there being means automatically releasing said latch in consequence of operation of said force exerting means to swing said upper link from said extended position to said retracted position.

5. In an airplane, the combination including: a plane structure providing a downwardly opening pocket; a strut consisting of an upper link and a lower link, said upper link having its upper end pivoted in the rear part of said pocket and having its lower end hinged to the upper end of said lower link; a landing means connected to the lower end of said lower link; means for collapsing said strut from an extended position by moving the parts thereof so that said upper link rests in a reclined position in the upper part of said pocket forwardly of the pivot of said upper link; and an arm connected to said plane structure to the rear of said landing wheel and said lower link for guiding said landing means forwardly and upwardly during the collapsing of said strut into a position in the lower part of said pocket below said upper link.

6. In an airplane, the combination including: a fuselage; ground engaging means at the tail of said fuselage; wing structures extending outwardly from the lower part of said fuselage, there being a pocket formed at the forward part of each of said wing structures; a landing gear structure associated with each of said wing structures comprising landing means, and retracting means for moving said landing means from a lowered position below each of said wing structures into a retracted position partly into the said pockets; and stop means separate from said retracting means for each of said landing means for determining their retracted position and for transferring landing shocks directly from said landing means to said wing structures so that said airplane may be landed with said landing means in retracted position, and so that said landing means and ground-engaging means will engage the ground upon landing, said landing means and said ground-engaging means at all times preventing said fuselage or wing structure from engaging the ground.

7. In an airplane, the combination including: a fuselage; ground-engaging means at the tail of said fuselage; wing structures, said wing structures including outwardly extending wings which are situated in substantially the plane of the lowermost part of said fuselage, nacelles extending forwardly from said wings, and pockets in said wing structures at least partly in said nacelles; motors carried by said nacelles; a landing gear structure associated with each of said wing structures comprising a landing means, and retracting means for moving said landing means from a lowered position below each of said wing structures into a retracted position partly into the said pockets; and stop means separate from said retracting means for each of said landing means for determining their retracted position and for transferring landing shocks directly from said landing means to said wing structures so that said airplane may be landed with said landing means in retracted position, and so that said landing means and ground-engaging means will engage the ground upon landing, said landing means and said ground-engaging means at all times preventing said fuselage or wing structure from engaging the ground.

8. In an airplane, the combination including: an airplane structure providing a downwardly opening pocket; a landing means; a collapsible strut connected to said airplane structure to which said landing means is connected, having an extended position for supporting said landing means and for transmitting landing forces from said landing means to said airplane structure, and having a retracted position in which said collapsible strut is in a collapsed position wherein said collapsible strut is incapable of transmitting landing forces from said landing means to said airplane structure; landing-force receiving means between said airplane structure and said landing means operable when said collapsible strut is in collapsed position, for transmitting landing forces from said landing means to said airplane structure; and means for moving said collapsible strut between extended and collapsed positions.

JAMES H. KINDELBERGER.
ARTHUR E. RAYMOND.